United States Patent
Zhao et al.

(10) Patent No.: US 8,817,771 B1
(45) Date of Patent: Aug. 26, 2014

(54) METHOD AND APPARATUS FOR DETECTING A BOUNDARY OF A DATA FRAME IN A COMMUNICATION NETWORK

(75) Inventors: Qing Zhao, Milpitas, CA (US);
Manyuan Shen, Milpitas, CA (US);
Leilei Song, Sunnyvale, CA (US);
Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 216 days.

(21) Appl. No.: 13/182,004

(22) Filed: Jul. 13, 2011

Related U.S. Application Data

(60) Provisional application No. 61/365,234, filed on Jul. 16, 2010.

(51) Int. Cl.
*H04J 3/06* (2006.01)

(52) U.S. Cl.
USPC .......................................... 370/350; 370/208

(58) Field of Classification Search
USPC ....................................................... 370/350
See application file for complete search history.

(56) References Cited

U.S. PATENT DOCUMENTS

| | | | |
|---|---|---|---|
| 4,449,190 A | 5/1984 | Flanagan et al. | |
| 5,134,633 A | 7/1992 | Werner | |
| 5,245,704 A | 9/1993 | Weber et al. | |
| 5,623,474 A | 4/1997 | Oshio et al. | |
| 5,650,860 A | 7/1997 | Uz | |
| 5,778,029 A | 7/1998 | Kaufmann | |
| 5,930,299 A | 7/1999 | Vannatta et al. | |
| 6,031,628 A | 2/2000 | Jacob et al. | |
| 6,222,889 B1 | 4/2001 | Lee | |
| 6,255,906 B1 | 7/2001 | Eidson et al. | |
| 6,266,517 B1 | 7/2001 | Fitzpatrick et al. | |
| 6,275,685 B1 | 8/2001 | Wessel et al. | |
| 6,639,944 B1 | 10/2003 | De Haan et al. | |
| 6,667,659 B2 | 12/2003 | Stengel et al. | |
| 6,731,406 B1 | 5/2004 | Ganapathy et al. | |
| 6,829,313 B1 | 12/2004 | Xu | |
| 6,912,249 B2 | 6/2005 | Haartsen | |
| 6,950,469 B2 | 9/2005 | Karczewicz et al. | |
| 6,983,026 B2 | 1/2006 | Pinckley et al. | |
| 7,023,941 B1 | 4/2006 | Rey et al. | |
| 7,173,992 B2 * | 2/2007 | Frigon | 375/354 |
| 7,180,901 B2 | 2/2007 | Chang et al. | |
| 7,200,799 B2 | 4/2007 | Wang et al. | |
| 7,213,194 B2 | 5/2007 | Nieminen | |
| 7,218,786 B2 | 5/2007 | Lin | |

(Continued)

OTHER PUBLICATIONS

"Final Office Action", U.S. Appl. No. 12/397,057, filed Feb. 1, 2013, 13 pages.

(Continued)

*Primary Examiner* — Michael J Moore, Jr.

(57) ABSTRACT

In embodiments of frame boundary detection, a data signal that includes a plurality of different synchronization signals is received. Symbol boundaries of orthogonal frequency-division multiplexing (OFDM) symbols are detected in the data signal based on signal characteristics of the OFDM symbols. The characteristics of the OFDM symbols include cyclic shift properties of the OFDM symbols, such as the characteristic that a first portion of an OFDM symbol is the same as a last portion of the OFDM symbol. One or more of the plurality of different synchronization signals in the data signal can be located using the detected symbol boundaries of the OFDM symbols to determine a frame boundary of a data frame in the data signal.

20 Claims, 7 Drawing Sheets

(56) References Cited

U.S. PATENT DOCUMENTS

| | | |
|---|---|---|
| 7,262,722 B1 | 8/2007 | Jahanghir et al. |
| 7,362,818 B1 | 4/2008 | Smith et al. |
| 7,418,057 B2 | 8/2008 | Shako et al. |
| 7,447,274 B2 | 11/2008 | Shako et al. |
| 7,450,641 B2 | 11/2008 | Sun et al. |
| 7,466,762 B2 | 12/2008 | Shako et al. |
| 7,532,590 B2 * | 5/2009 | Ok et al. ............... 370/310 |
| 7,599,431 B1 | 10/2009 | Anderson et al. |
| 7,675,886 B2 | 3/2010 | Agrawal et al. |
| 7,684,627 B2 | 3/2010 | Ranganathan |
| 7,702,020 B2 | 4/2010 | Gallant et al. |
| 7,706,475 B1 | 4/2010 | Kopikare et al. |
| 7,782,973 B2 | 8/2010 | Kim et al. |
| 7,822,147 B2 | 10/2010 | Huang et al. |
| 7,965,710 B1 | 6/2011 | Choi et al. |
| 7,969,964 B2 * | 6/2011 | Kim et al. ............... 370/350 |
| 7,991,063 B2 * | 8/2011 | Khan et al. ............... 375/260 |
| 8,014,737 B2 | 9/2011 | Pratt et al. |
| 8,059,588 B2 * | 11/2011 | Sood ............... 370/328 |
| 8,059,630 B2 * | 11/2011 | Prateek ............... 370/350 |
| 8,160,150 B2 | 4/2012 | Moore |
| 8,311,031 B2 * | 11/2012 | Kim et al. ............... 370/350 |
| 8,345,533 B1 | 1/2013 | Zhao et al. |
| 8,345,714 B2 * | 1/2013 | Ryu et al. ............... 370/511 |
| 8,498,342 B1 | 7/2013 | Sha et al. |
| 8,520,771 B1 | 8/2013 | Brunn et al. |
| 8,542,571 B2 * | 9/2013 | Kim et al. ............... 370/208 |
| 8,542,725 B1 | 9/2013 | Qian et al. |
| 8,565,325 B1 | 10/2013 | Banerjea |
| 8,576,830 B2 * | 11/2013 | Swarts et al. ............... 370/350 |
| 8,614,994 B2 * | 12/2013 | Swarts et al. ............... 370/336 |
| 8,681,730 B2 * | 3/2014 | Swarts et al. ............... 370/330 |
| 8,681,893 B1 | 3/2014 | Brunn et al. |
| 8,761,261 B1 | 6/2014 | Wang |
| 2002/0053058 A1 | 5/2002 | Lee et al. |
| 2002/0067773 A1 | 6/2002 | Jackson et al. |
| 2002/0072346 A1 | 6/2002 | Kato et al. |
| 2003/0098804 A1 | 5/2003 | Ekstrand et al. |
| 2003/0108135 A1 * | 6/2003 | Frigon ............... 375/354 |
| 2003/0126551 A1 | 7/2003 | Mantha et al. |
| 2003/0164736 A1 | 9/2003 | Stengel et al. |
| 2003/0179831 A1 | 9/2003 | Gupta et al. |
| 2004/0090909 A1 | 5/2004 | Khlat |
| 2004/0141525 A1 | 7/2004 | Bhushan et al. |
| 2004/0148546 A1 | 7/2004 | Meyer et al. |
| 2004/0223473 A1 | 11/2004 | Ha et al. |
| 2004/0232984 A1 | 11/2004 | Meade et al. |
| 2005/0018519 A1 | 1/2005 | Nii |
| 2005/0213661 A1 | 9/2005 | Xiang et al. |
| 2005/0231292 A1 | 10/2005 | Akahori et al. |
| 2005/0243946 A1 | 11/2005 | Chung et al. |
| 2005/0276266 A1 | 12/2005 | Terry |
| 2006/0084389 A1 | 4/2006 | Beale et al. |
| 2006/0126962 A1 | 6/2006 | Sun |
| 2006/0174236 A1 | 8/2006 | Stein et al. |
| 2006/0227895 A1 | 10/2006 | Booth et al. |
| 2007/0016838 A1 | 1/2007 | Mielczarek et al. |
| 2007/0025448 A1 | 2/2007 | Cha et al. |
| 2007/0086528 A1 | 4/2007 | Mauchly et al. |
| 2007/0092013 A1 | 4/2007 | Cahn et al. |
| 2007/0118791 A1 | 5/2007 | Hepler et al. |
| 2007/0135065 A1 | 6/2007 | Leffel et al. |
| 2007/0241812 A1 | 10/2007 | Yang et al. |
| 2008/0031376 A1 | 2/2008 | Ban |
| 2008/0040411 A1 | 2/2008 | Stojancic et al. |
| 2008/0043702 A1 * | 2/2008 | Moon et al. ............... 370/342 |
| 2008/0049709 A1 | 2/2008 | Pan et al. |
| 2008/0074289 A1 | 3/2008 | Sauder et al. |
| 2008/0089282 A1 * | 4/2008 | Malladi et al. ............... 370/329 |
| 2008/0090583 A1 | 4/2008 | Wang et al. |
| 2008/0094280 A1 | 4/2008 | Fenton |
| 2008/0123515 A1 | 5/2008 | Boehlke et al. |
| 2008/0219373 A1 | 9/2008 | Zhang et al. |
| 2008/0247467 A1 | 10/2008 | Rusanovskyy et al. |
| 2008/0270344 A1 | 10/2008 | Yurick et al. |
| 2008/0279322 A1 | 11/2008 | Franovici et al. |
| 2009/0086820 A1 | 4/2009 | Hong et al. |
| 2009/0097533 A1 | 4/2009 | Lakkis |
| 2009/0103622 A1 | 4/2009 | Tripathi et al. |
| 2009/0181622 A1 | 7/2009 | Hardacker |
| 2009/0213946 A1 * | 8/2009 | Dick et al. ............... 375/260 |
| 2009/0257526 A1 | 10/2009 | Wang et al. |
| 2009/0310704 A1 | 12/2009 | Jethanandani et al. |
| 2010/0035554 A1 | 2/2010 | Ba et al. |
| 2010/0061306 A1 * | 3/2010 | Ryu et al. ............... 370/328 |
| 2010/0077275 A1 | 3/2010 | Yu et al. |
| 2010/0135257 A1 * | 6/2010 | Higuchi et al. ............... 370/336 |
| 2010/0239034 A1 * | 9/2010 | Lee et al. ............... 375/260 |
| 2011/0007717 A1 * | 1/2011 | Swarts et al. ............... 370/336 |
| 2011/0007718 A1 * | 1/2011 | Swarts et al. ............... 370/336 |
| 2011/0013730 A1 * | 1/2011 | Mansson et al. ............... 375/340 |
| 2013/0021976 A1 * | 1/2013 | Yang et al. ............... 370/328 |
| 2013/0142060 A1 * | 6/2013 | Challa et al. ............... 370/252 |

OTHER PUBLICATIONS

"Final Office Action", U.S. Appl. No. 12/253,078, filed Feb. 13, 2013, 21 pages.

"Final Office Action", U.S. Appl. No. 12/511,629, filed Dec. 7, 2012, 7 pages.

"Final Office Action", U.S. Appl. No. 12/397,057, filed Apr. 27, 2012, 11 pages.

"Non-Final Office Action", U.S. Appl. No. 12/269,744, filed Feb. 16, 2012, 14 pages.

"Non-Final Office Action", U.S. Appl. No. 12/511,629, filed Apr. 13, 2012, 6 pages.

"Non-Final Office Action", U.S. Appl. No. 12/540,753, filed Apr. 5, 2012, 14 pages.

"Final Office Action", U.S. Appl. No. 12/510,716, filed Jun. 28, 2012, 10 pages.

"Non-Final Office Action", U.S. Appl. No. 12/253,078, filed Jun. 8, 2012, 18 pages.

"Non-Final Office Action", U.S. Appl. No. 12/397,057, filed Aug. 1, 2012, 10 pages.

"Non-Final Office Action", U.S. Appl. No. 12/574,879, filed Jun. 4, 2012, 11 pages.

"Notice of Allowance", U.S. Appl. No. 12/540,753, filed Aug. 27, 2012, 5 pages.

"Final Office Action", U.S. Appl. No. 12/574,879, filed Nov. 20, 2012, 13 pages.

"Final Office Action", U.S. Appl. No. 12/269,744, filed Sep. 19, 2012, 13 pages.

"Final Office Action", U.S. Appl. No. 12/511,606, filed Sep. 13, 2012, 8 pages.

"Non-Final Office Action", U.S. Appl. No. 12/767,922, filed Nov. 2, 2012, 12 pages.

"Advisory Action", U.S. Appl. No. 11/945,151, filed Nov. 22, 2010, 3 pages.

"Advisory Action", U.S. Appl. No. 11/945,183, filed Nov. 9, 2010, 2 pages.

"Final Office Action", U.S. Appl. No. 11/945,151, filed Aug. 26, 2011, 20 pages.

"Final Office Action", U.S. Appl. No. 11/945,151, filed Sep. 10, 2010, 27 pages.

"Final Office Action", U.S. Appl. No. 11/945,183, filed Sep. 13, 2010, 12 pages.

"Non-Final Office Action", U.S. Appl. No. 11/945,151, filed Mar. 25, 2010, 22 pages.

"Non-Final Office Action", U.S. Appl. No. 11/945,151, filed Mar. 28, 2011, 22 pages.

"Non-Final Office Action", U.S. Appl. No. 11/945,183, filed Apr. 5, 2010, 8 pages.

"Non-Final Office Action", U.S. Appl. No. 12/397,057, filed Nov. 9, 2011, 7 pages.

"Non-Final Office Action", U.S. Appl. No. 12/510,716, Nov. 8, 2011, 8 pages.

"Non-Final Office Action", U.S. Appl. No. 12/511,606, filed Jan. 4, 2012, 6 pages.

(56) References Cited

OTHER PUBLICATIONS

"Notice of Allowance", U.S. Appl. No. 11/945,183, filed Feb. 23, 2011, 7 pages.
"Part 16: Air Interface for Fixed and Mobile Broadband Wireless Access Systems; Amendment 2: Physical and Medium Access Control Layers for Combined Fixed and Mobile Operation in Licensed Bands", *IEEE Std 802.16e*, (Feb. 28, 2006), 822 pages.
"Part 16: Air Interface for Fixed Broadband Wireless Access Systems", *IEEE Std. 802.16*, (Oct. 1, 2004), 857 pages.
"Non-Final Office Action", U.S. Appl. No. 12/269,744, filed Aug. 18, 2011, 10 pages.
"Restriction Requirement", U.S. Appl. No. 12/269,744, filed Jun. 22, 2011, 6 pages.
Mujtaba, Syed A., "TGn Sync Proposal Technical Specification", *IEEE 802.11-04 / Wireless LANs*, (May 2005), pp. 1-131.
Zhang, Hongyuan et al., U.S. Appl. No. 12/098,222, filed Apr. 4, 2008, 78 pages.
"Non-Final Office Action", U.S. Appl. No. 12/574,879, filed Apr. 23, 2013, 13 pages.
"Notice of Allowance", U.S. Appl. No. 12/269,744, filed Apr. 10, 2013, 11 pages.
"Notice of Allowance", U.S. Appl. No. 12/767,922, filed Apr. 16, 2013, 5 pages.
"Notice of Allowance", U.S. Appl. No. 12/511,629, filed Mar. 28, 2013, 7 pages.
"Notice of Allowance", U.S. Appl. No. 12/397,057, filed May 15, 2013, 7 pages.
"Supplemental Notice of Allowance", U.S. Appl. No. 12/269,744, filed May 20, 2013, 8 pages.
"Supplemental Notice of Allowance", U.S. Appl. No. 12/269,744, filed Jul. 1, 2013, 8 pages.
"Non-Final Office Action", U.S. Appl. No. 12/510,716, filed Oct. 23, 2013, 12 pages.
"Supplemental Notice of Allowance", U.S. Appl. No. 12/397,057, filed Aug. 26, 2013, 2 pages.
"Non-Final Office Action", U.S. Appl. No. 12/253,078, filed Nov. 21, 2013, 25 pages.
"Supplemental Notice of Allowance", U.S. Appl. No. 12/269,744, filed Aug. 23, 2013, 7 pages.
"Notice of Allowance", U.S. Appl. No. 12/574,879, filed Oct. 31, 2013, 7 pages.
"Non-Final Office Action", U.S. Appl. No. 12/511,606, filed Aug. 22, 2013, 8 pages.
"Non-Final Office Action", U.S. Appl. No. 13/966,753, filed Dec. 24, 2013, 8 pages.
"Final Office Action", U.S. Appl. No. 12/574,879, filed Oct. 1, 2013, 9 pages.
"Non-Final Office Action", U.S. Appl. No. 13/727,331, Apr. 3, 2014, 5 pages.
"Non-Final Office Action", U.S. Appl. No. 13/951,203, Apr. 2, 2014, 4 pages.
"Non-Final Office Action", U.S. Appl. No. 14/058,879, Jan. 31, 2014, 12 pages.
"Notice of Allowance", U.S. Appl. No. 12/510,716, Feb. 6, 2014, 6 pages.
"Notice of Allowance", U.S. Appl. No. 12/253,078, Jun. 20, 2014, 8 pages.

\* cited by examiner

METHOD AND APPARATUS FOR DETECTING A BOUNDARY OF A DATA FRAME IN A COMMUNICATION NETWORK

RELATED APPLICATION

This disclosure claims priority to U.S. Provisional Patent Application Ser. No. 61/365,234 filed on Jul. 16, 2010, the disclosure of which is incorporated by reference herein in its entirety.

BACKGROUND

The Background described in this section is included merely to present a general context of the disclosure. The Background description is not prior art to the claims in this application, and is not admitted to be prior art by inclusion in this section.

The long term evolution (LTE) communication system is a mobile communication network that includes devices implemented to receive LTE data signals from LTE base stations, known as Evolved NodeB (eNodeB) base stations. LTE data signals are composed of LTE data frames that have a pre-defined structure. In order to communicate over an LTE communication network, LTE communication devices must first connect to an LTE base station. To connect to an LTE base station (such as when a communication device is powered on), an LTE communication device determines a frame boundary of an LTE data frame in an LTE data signal. Once the boundary of the LTE data frame is determined, the communication device can recognize patterns in the LTE data signal and derive a variety of information from the signal. However, conventional approaches to determine a frame boundary of an LTE data frame are typically computationally complex.

SUMMARY

This Summary introduces concepts of frame boundary detection, and the concepts are further described below in the Detailed Description and/or shown in the Figures. Accordingly, this Summary should not be considered to describe essential features nor used to limit the scope of the claimed subject matter.

In one aspect, the present disclosure describes a communication device that includes one or more antennas to receive a data signal that includes a plurality of different synchronization signals. The communication device also includes a frame boundary detection service that is implemented to detect symbol boundaries of orthogonal frequency-division multiplexing (OFDM) symbols in the data signal based on signal characteristics of the OFDM symbols. The frame boundary detection service is also implemented to locate one or more of the plurality of different synchronization signals in the data signal using the detected symbol boundaries of the OFDM symbols to determine a frame boundary of a data frame in the data signal. In an embodiment, a fractional carrier frequency offset can be determined and compensated for when detecting the symbol boundaries of the OFDM symbols.

A method is implemented to receive a long term evolution (LTE) data signal, and detect symbol boundaries of OFDM symbols in the LTE data signal based on signal characteristics of the OFDM symbols. The method is further implemented to locate a secondary synchronization signal in the LTE data signal using the detected symbol boundaries of the OFDM symbols to determine a frame boundary of an LTE data frame in the LTE data signal A system-on-chip (SoC) includes an LTE signal receiver to receive an LTE data signal. The SoC also includes a frame boundary detection service programmed to detect symbol boundaries of OFDM symbols in the LTE data signal based on signal characteristics of the OFDM symbols. The frame boundary detection service is also programmed to locate a secondary synchronization signal in the LTE data signal using the detected symbol boundaries of the OFDM symbols to determine a frame boundary of an LTE data frame in the LTE data signal.

BRIEF DESCRIPTION OF THE DRAWINGS

Embodiments of frame boundary detection are described with reference to the following Figures. The same numbers may be used throughout to reference like features and components that are shown in the Figures.

DETAILED DESCRIPTION

Figure 1:
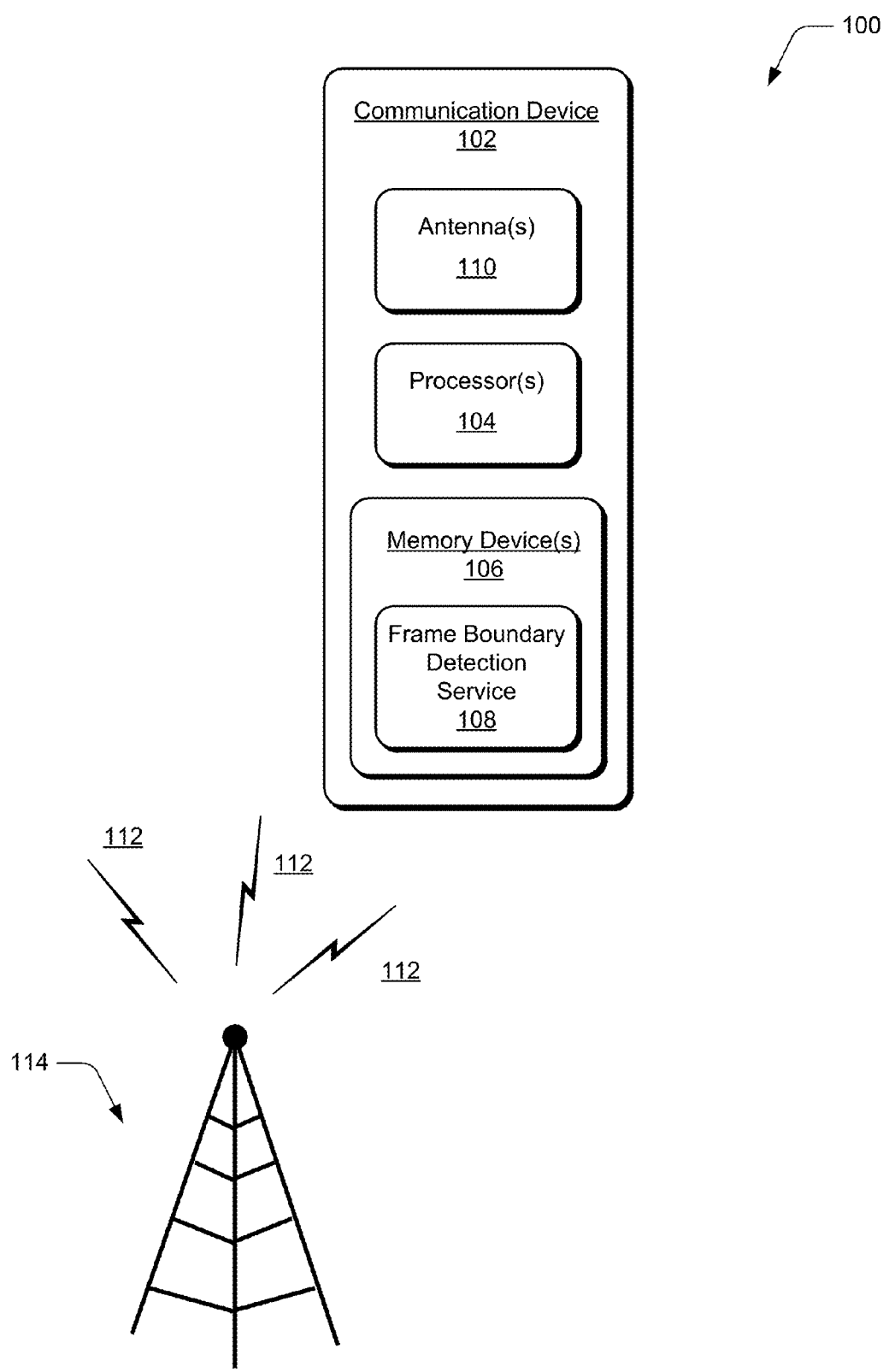
FIG. 1 illustrates an example LTE communication system in which embodiments of frame boundary detection can be implemented.

Embodiments of frame boundary detection provide techniques to detect a frame boundary of a long term evolution (LTE) data frame in an LTE data signal, such as in an LTE enabled communication device. The LTE data signal includes multiple distinct synchronization signals, including a pair of identical primary synchronization signals and a pair of different secondary synchronization signals, allocated in pre-defined frequency and time locations. Locating only a pair of primary synchronization signals may not be sufficient for frame boundary detection, but helps to reduce the complexity of detecting the secondary synchronization signals. An LTE data frame is composed of multiple orthogonal frequency-division multiplexing (OFDM) symbols that are configured to carry data. To detect a frame boundary of an LTE data frame, the OFDM symbols are examined to locate the primary synchronization signals and a pair of secondary synchronization signals. In one implementation, the pair of secondary synchronization signals is stored at the same location in each LTE data frame. Therefore, in such an implementation, the frame boundary of an LTE data frame can be determined once the pair of secondary synchronization signals is located using the known location of the pair of secondary synchronization signals in each LTE data frame.

Conventional LTE communication devices do not determine the symbol boundaries of OFDM symbols in an LTE data signal, and thus primary synchronization and secondary synchronization signal detection may not be possible, or may suffer a significant performance loss, unless a symbol length piece of data that approximately begins and ends at an OFDM symbol boundary is examined. For example, if a piece of data is examined that includes equal parts of two adjacent OFDM symbols, the primary synchronization and secondary synchronization signal cannot be detected. Therefore, conventional LTE communication devices search for the OFDM symbol boundaries and the primary synchronization and secondary synchronization signals at the same time. This process is computationally complex because multiple symbol-length data observations must be performed to locate a primary synchronization or a secondary synchronization signal, which indicates that the OFDM symbol boundary has also been found.

Rather than searching for the OFDM symbol boundaries and the primary synchronization and secondary synchronization signals at the same time, embodiments of frame boundary detection are implemented to detect symbol boundaries of OFDM symbols in an LTE data signal using signal characteristics of the OFDM symbols prior to searching for the primary synchronization and secondary synchronization signals. The signal characteristics of the OFDM symbols include cyclic shift properties of the OFDM symbols, such as the characteristic that a first portion of an OFDM symbol is the same as a last portion of the OFDM symbol. After the symbol boundaries of the OFDM symbols are detected, a secondary synchronization signal in an LTE data signal is located using the detected symbol boundaries of the OFDM symbols to determine a frame boundary of an LTE data frame in the LTE data signal. As described in more detail below, the computational complexity of LTE frame boundary detection is significantly reduced by decoupling the processes of detecting OFDM symbol boundaries and detecting the primary synchronization and secondary synchronization signals.

While features and concepts of frame boundary detection can be implemented in any number of different devices, systems, environments, networks, and/or configurations, embodiments of frame boundary detection are described in the context of the following example devices, systems, and methods.

FIG. 1 illustrates an example LTE communication system 100 in which embodiments of frame boundary detection can be implemented. Example LTE communication system 100 includes a communication device 102, which may be any type of device that is configured to communicate in an LTE communication system. The communication device 102 can be any one or combination of a fixed or mobile device, in any form of a mobile phone, portable computer, communication device, tablet device, media player, consumer electronic device, and the like.

The communication device 102 includes various components to enable the device for communication in an LTE communication system, such as one or more processors 104 (e.g., any of microprocessors, controllers, and the like) and memory devices 106. The communication device 102 can also be implemented with any number and combination of differing components as further described with reference to the example device shown in FIG. 8. The processors and memory implement a frame boundary detection service 108 that can be implemented as computer-executable instructions, such as a software application, that is executable to implement the various embodiments of frame boundary detection described herein.

The communication device 102 also includes one or more antennas 110 that are implemented to receive LTE data signals 112 from LTE base station 114, such as an Evolved NodeB (eNodeB) base station. LTE data signals are composed of repeating LTE data frames that have a predefined and consistent structure and characteristics. To connect to the LTE communication system (such as when communication device 102 is first powered on), frame boundary detection service 108 is implemented to determine a frame boundary of an LTE data frame in an LTE data signal 112.

Although shown as independent components, the one or more antennas 110, the processors 104, memory devices 106, and the frame boundary detection service 108 may all be implemented as a system-on-chip (SoC) in a communication device, such as described with reference to the example SoC shown in FIG. 5.

Figure 2:
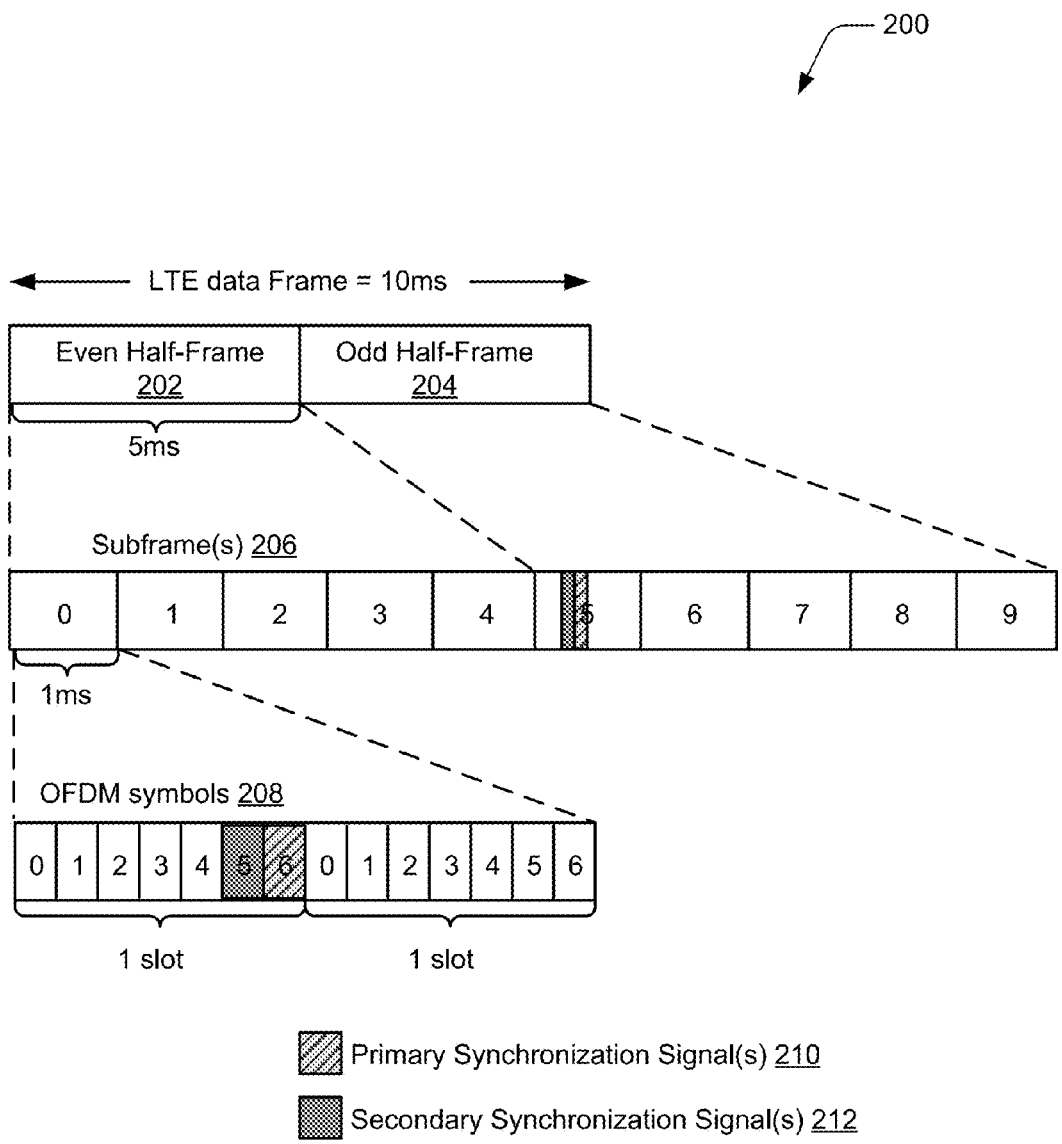
FIG. 2 illustrates an example LTE data frame in accordance with one or more embodiments of frame boundary detection.

FIG. 2 illustrates an example LTE data frame 200 of an LTE data signal 112. Example LTE data frame 200 is 10 ms long and includes an even half-frame 202 and an odd half-frame 204 that are both 5 ms in length. Data frame 200 can also be divided into ten subframes 206 that are each 1 ms in length and are made up of two slots. Each slot in subframe 206 includes multiple orthogonal frequency-division multiplexing (OFDM) symbols that are configured to carry data in an LTE data signal. In LTE data frame 200, there are seven OFDM symbols in each slot, but it is to be appreciated that the number of OFDM symbols per slot vary based on the type of LTE data frame.

LTE data frame 200 also includes primary synchronization signals 210 and secondary synchronization signals 212 that are located in a fixed position in each data frame. In LTE data frame 200, the primary synchronization signals are located in the first slot of subframe 0 at OFDM symbol 6 and in the first slot of subframe 5 at OFDM symbol 6. The secondary synchronization signals are located in the first slot of subframe 0 at OFDM symbol 5 and in the first slot of subframe 5 at OFDM symbol 5. It is to be appreciated, however, that the location of the primary synchronization and secondary synchronization signals may vary based on the type of LTE data frame.

The primary synchronization signal and the secondary synchronization signal are generated by base station 114 based on an identifier corresponding to the LTE base station. The primary synchronization signal is selected from one of three different signals that are indexed as 0, 1, and 2. The pair of secondary synchronization signals may be selected from one of 504 pairs that are indexed 0-503. This index is also noted as a cell identifier. Each primary synchronization signal comprises a 63-bit Zandoff-Chu sequence with the $32^{nd}$-bit set to zero. Each secondary synchronization signal comprises a 63-bit binary sequence with the $32^{nd}$-bit set to zero, the first 31 bits being a 31-bit scrambled m-sequence and the last 31 bits being a different 31-bit scrambled m-sequence. The base station identifier may be computed from the values of the primary synchronization signal (PSS) and the secondary synchronization signal (SSS), as follows:

Base Station ID=(PSS*168)+SSS

Accordingly, if the primary synchronization and secondary synchronization signals are detected, the base station ID may be calculated. It should be noted that if just the secondary synchronization signals are detected the computational complexity is higher because there could be 504 different pairs of secondary synchronization signals. If, however, the primary synchronization signal is detected first, then the computational complexity of locating the secondary synchronization signals is decreased because there can only be 168 possible pairs of secondary synchronization signals.

As discussed above, the location of the primary synchronization and secondary synchronization signals are fixed relative to the structure of the LTE data frame. More specifically, the same primary synchronization signal is located in each even half-frame 202 and odd half-frame 204 at a predefined location in both the frequency and time dimension. Therefore, primary synchronization signals can be used to detect a half-frame boundary. However, primary synchronization signals cannot be used without further information to detect a frame boundary of an LTE data frame.

A pair of secondary synchronization signals is transmitted in every frame in a predefined location in both the frequency and time dimension. As described herein, a pair of secondary synchronization signals includes a secondary synchronization signal that is located in even half-frames 202 of an LTE data frame 200, and includes an additional secondary synchronization signal that is located in odd half-frames 204 of the LTE data frame. It should be noted that each of the secondary synchronization signals in the pair of secondary synchronization signals are different Therefore, the frame boundary of an LTE data frame 200 can be determined once either of the secondary synchronization signals is detected.

Accordingly, when an LTE data signal 112 is received, communication device 102 has the following information: 1) the frame structure of LTE data frames in the LTE data signal (e.g., both the frequency and the time location of the primary synchronization and secondary synchronization signals); 2) the signal waveforms of all possible primary synchronization and secondary synchronization signals; and 3) signal characteristics of OFDM symbols. The communication device 102, however, does not determine which set of primary synchronization and secondary synchronization signals is used by the communication device that transmits the data signal. Therefore, the communication device must search for the primary synchronization and secondary synchronization signals in the OFDM symbols. When the secondary synchronization signals are located, the frame boundary of an LTE data frame can then be determined based on the predefined frame structure of LTE data frames and based on the location of the secondary synchronization signals.

Conventional attempts at detecting the frame boundary of an LTE data frame are computationally complex because in order to find the secondary synchronization signals, multiple time trials in an OFDM symbol length observation window must be examined.

Figure 3:
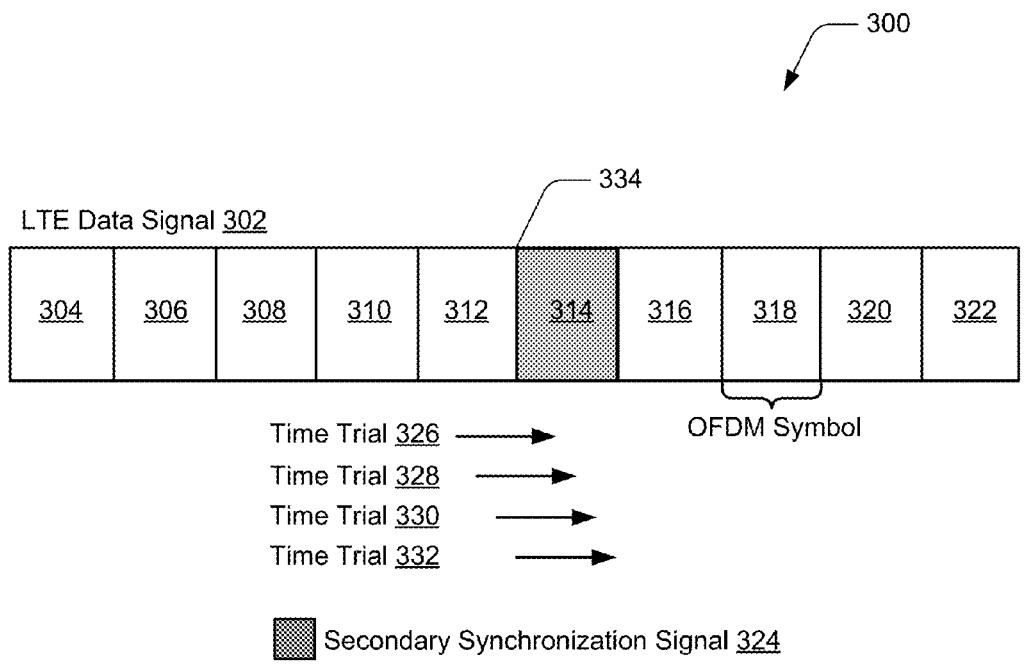
FIG. 3 illustrates an example of a conventional approach to frame boundary detection.

FIG. 3 illustrates an example 300 of a conventional approach to frame boundary detection. Example 300 includes an LTE data signal 302 that includes multiple OFDM symbols 304-322. In this example, OFDM symbol 314 is carrying a secondary synchronization signal 324. To detect secondary synchronization signal 324, multiple symbol length time trials 326, 328, 330, and 332 must be performed because a symbol boundary 334 between OFDM symbol 312 and OFDM symbol 314 is unknown. Each time trial must then be examined to determine whether a primary synchronization or secondary synchronization signal is found. Time trials 326, 328, and 330 include part of OFDM symbol 312 and part of OFDM symbol 314. Therefore, the secondary synchronization signal cannot be detected from these time trials. It is not until time trial 332 is performed, which begins at symbol boundary 334, that the secondary synchronization signal can be detected.

This conventional approach is known as joint OFDM symbol boundary and primary synchronization and secondary synchronization signal detection because both the OFDM symbol boundaries as well as the primary synchronization and secondary synchronization signals are detected at the same time. In other words, the symbol boundary is not detected until a primary synchronization or a secondary synchronization signal is detected which indicates that the symbol length time trial began at the symbol boundary. Therefore, conventional approaches to LTE frame boundary detection are computationally complex because multiple time trials are required for each OFDM symbol.

In various embodiments, the frame boundary detection service 108 at the communication device 102 is implemented to detect symbol boundaries of OFDM symbols 208 in an LTE data signal 112 using signal characteristics of the OFDM symbols prior to searching for the primary synchronization or secondary synchronization signals. The signal characteristics of the OFDM symbols may include cyclic shift properties of the OFDM symbols. One of the cyclic shift properties used to detect the symbol boundaries of the OFDM symbols is that a first portion of an OFDM symbol is the same as a last portion of the OFDM symbol. Using the signal characteristics of the OFDM symbols, therefore, the symbol boundaries of the OFDM symbols can be determined prior to searching for the primary synchronization and secondary synchronization signals. For example, the frame boundary detection service may examine the OFDM symbols to detect repeating portions. These repeating portions may then be identified by the frame boundary detection service as being the beginning and ending boundaries of the OFDM symbols.

After detecting the symbol boundaries of the OFDM symbols 208, the frame boundary detection service 108 is implemented to then locate any of a pair of secondary synchronization signals 212 in the LTE data signal 112 using the detected symbol boundaries of the OFDM symbols to determine a frame boundary of an LTE data frame 200 in the LTE data signal. In embodiments, the frame boundary detection service is implemented to convert the OFDM symbols from the time domain to the frequency domain using a Fast Fourier Transform (FFT) to locate the secondary synchronization signals. The OFDM symbols are converted into the frequency domain because the signal waveforms of all of the primary synchronization and secondary synchronization signals are known. Therefore, by converting the OFDM symbols into the frequency domain, each OFDM symbol can be examined to see if it is carrying one of the known primary synchronization signal or secondary synchronization signal waveforms. In other embodiments, the frame boundary detection service is implemented to locate the secondary synchronization signals in the time domain. In these embodiments, therefore, FFT may not be taken prior to detecting the primary synchronization and secondary synchronization signals.

In various embodiments, the frame boundary detection service 108 is implemented to locate the secondary synchronization signals 212 by examining the OFDM symbols 208 using the detected symbol boundaries of the OFDM symbols to locate a primary synchronization signal or a secondary synchronization signal. In some embodiments, when frame boundary detection service 108 locates a primary synchronization signal 210 prior to locating a secondary synchronization signal 212, the frame boundary detection service is implemented to then locate the secondary synchronization signals using the location of the primary synchronization signal. In other words, once the primary synchronization signal is located the frame boundary detection service can then locate the secondary synchronization signals in the LTE data frame by searching for the secondary synchronization signals using the predefined locations of the secondary synchronization signals relative to the location of the primary synchronization signal in an LTE data frame. It should be noted that the computational complexity of locating the secondary synchronization signals is reduced when the primary synchronization signal is located first, not only because the number of possible secondary synchronization signals is divided by three from 504 to 168 possible secondary synchronization signals, but also because the locations of the secondary synchronization signals have been determined by referring to the primary synchronization signal location. Therefore, the number of secondary synchronization signals that must be examined to locate the secondary synchronization signals is decreased which reduces the computational complexity. It is to be appreciated that whether a primary synchronization signal or a secondary synchronization signal is located first may simply be based on the random order in which the OFDM symbols are examined.

In other embodiments, when the frame boundary detection service 108 locates a first secondary synchronization signal 212 of the pair of secondary synchronization signals prior to locating a primary synchronization signal 210, the frame boundary detection service is implemented to then locate a second secondary synchronization signal of the pair of secondary synchronization signals using the location of the first secondary synchronization signal. As described herein, the terms "first secondary synchronization signal" and "second secondary synchronization signal" refer only to the order in which the secondary signals are detected. In other words, once the first secondary synchronization signal is found, the frame boundary detection service can then locate the second secondary synchronization signal in the pair of secondary synchronization signals in the LTE data frame by searching for the second secondary synchronization signal using the predefined location of the second secondary synchronization signal relative to the location of the first secondary synchronization signal in the LTE data frame. Locating the second secondary synchronization signal is optional and generally easy to locate once the first secondary synchronization signal is found. Therefore, locating the second secondary synchronization signal may be performed simply for frame boundary detection verification.

It is to be appreciated, therefore, that embodiments of frame boundary detection decouples OFDM symbol boundary detection and primary synchronization and secondary synchronization signal detection. In this way, when the frame boundary detection service 108 searches for the primary synchronization and secondary synchronization signals, the symbol boundaries of the OFDM symbols are already known and the frame boundary detection service only needs to examine each OFDM symbol to determine if the current OFDM symbol contains a primary synchronization or a secondary synchronization signal, and which primary synchronization or secondary synchronization signal is contained in the symbol.

Figure 4:
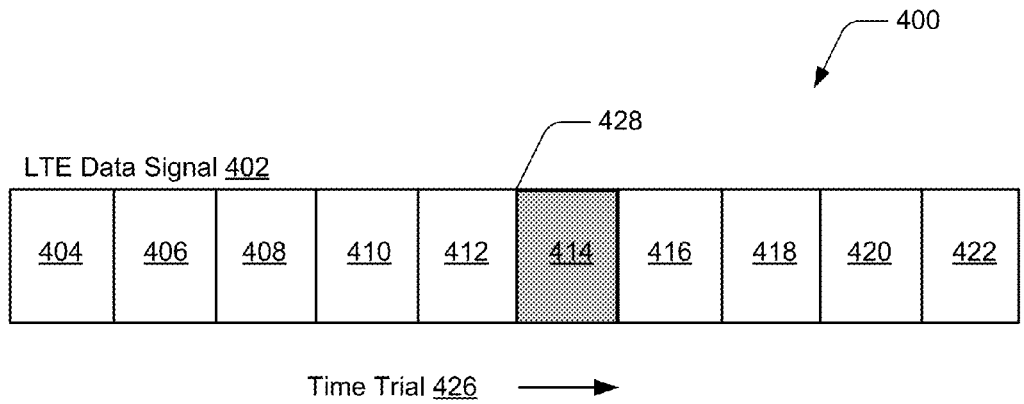
FIG. 4 illustrates an example of LTE frame boundary detection in accordance with one or more embodiments of frame boundary detection.

FIG. 4 illustrates an example 400 of LTE frame boundary detection in accordance with various embodiments. In FIG. 4, the OFDM symbol boundaries are detected prior to searching for the primary synchronization and secondary synchronization signals. Example 400 includes an LTE data signal 402 that includes multiple OFDM symbols 404-422. In this example, OFDM symbol 414 is carrying a secondary synchronization signal 424. To detect the secondary synchronization signal, only a single symbol length time trial 426 is performed from a symbol boundary 428 because the location of symbol boundary 428 is known prior to examining the OFDM symbols to locate the primary synchronization and secondary synchronization signals. Therefore, when time trial 426 is observed, the secondary synchronization signal can be detected. It is to be appreciated that his approach reduces the computational complexity of LTE frame boundary detection because unlike conventional approaches, such as the conventional approach illustrated in FIG. 3, only a single time trial is performed for each OFDM symbol. While FIG. 4 illustrates time trial 426 as being the length of a one OFDM symbol, other embodiments are contemplated in which each time trial may be more than one OFDM symbol in length.

After locating secondary synchronization signals 212, frame boundary detection service 108 is then implemented to determine the frame boundary of the LTE data frame 200 based on the location of the secondary synchronization signals and a frame structure of the LTE data frame. For example, once the secondary synchronization signals are located, the boundary of the LTE data frame can then be determined based on the predefined location of the secondary synchronization signals in the LTE data frame.

Carrier frequency offset (CFO) is the difference in carrier frequency transmitted from the base station 114 and the carrier frequency received at communication device 102 by antenna 110. The CFO includes integer and fractional parts, denoted as integer CFO and fractional CFO, respectively. If the fractional CFO is not compensated for, significant performance loss may occur. In an embodiment, the frame boundary detection service 108 is implemented to determine and compensate for a fractional carrier frequency offset (CFO) when detecting the symbol boundaries of the OFDM symbols. The frame boundary detection service 108 is implemented to then determine and compensate for the integer CFO during primary synchronization and secondary synchronization signal detection.

It is to be appreciated that embodiments of frame boundary detection significantly reduces the computational complexity of frame boundary detection compared to conventional approaches. As described herein, computational complexity refers to the number of complex multiplications and additions required to detect a frame boundary. For example, conventional primary synchronization and secondary synchronization signal detection requires $N_T*N_F*C1$ complex multiplications per OFDM symbol, where $N_T$ is the number of tentative symbol boundaries for each symbol (e.g., the number of timing trials performed), $N_F$ is the number of tentative fractional CFO trials, and C1 is the number of complex multiplications required for primary synchronization and secondary synchronization signal detection given one tentative symbol boundary and one fractional CFO trial.

In embodiments of frame boundary detection, primary synchronization and secondary synchronization signal detection per symbol may use only C1+C2 complex multiplications, where C2 complex multiplications is caused by OFDM symbol boundary and fractional CFO estimation using signal characteristics of OFDM symbols. If OFDM symbol length is $SYM_{LEN}$, C1 is in the order of log 2 $(SYM_{LEN})*SYM_{LEN}$, while C2 is in the order of $SYM_{LEN}$ and can essentially be ignored because this number is very small relative to the value of C1. It is to be appreciated, therefore, that because C2 is essentially negligible, compared to C1, embodiments of frame boundary detection reduces the computational complexity of LTE frame boundary detection from $N_T*N_F*C1$ to approximately C1.

Embodiments of frame boundary detection disclosed herein may significantly improve performance of frame boundary detection compared to conventional approaches. Frame boundary detection performance corresponds to residue errors of symbol boundary and fractional CFO estimates. In conventional approaches, these residue errors are decided by resolution of tentative estimates. In embodiments of frame boundary detection, however, the residue errors may approach zero.

Figure 5:
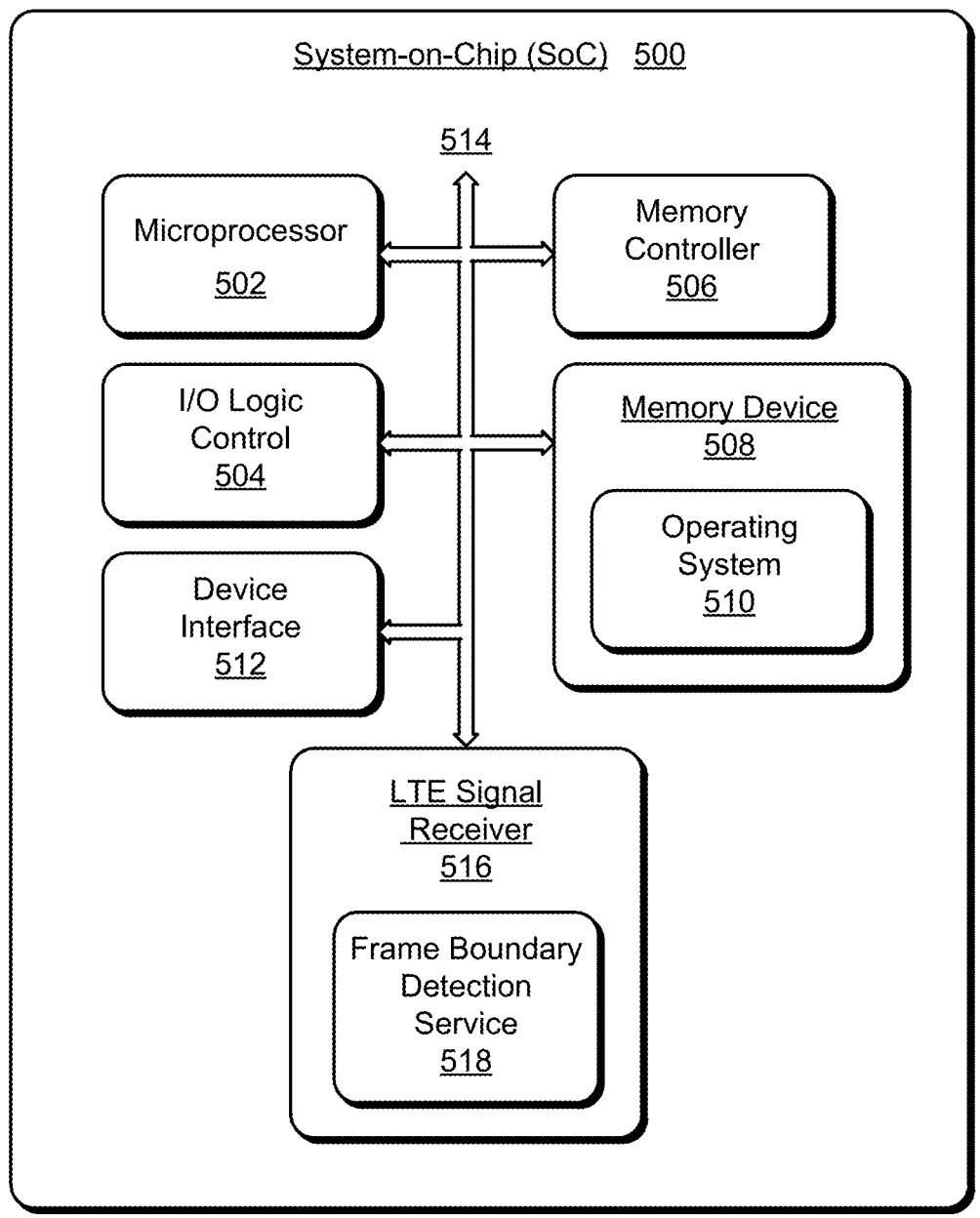
FIG. 5 illustrates an example system-on-chip (SoC) in which embodiments of frame boundary detection can be implemented.

FIG. 5 illustrates an example system-on-chip (SoC) 500, which can implement various embodiments of frame boundary detection as described herein. The SoC may be implemented in a fixed or mobile device, such as any one or combination of a consumer, electronic, communication, navigation, media, and/or computing device, as well as in a vehicle that implements a navigation system. The SoC 500 can be integrated with electronic circuitry, a microprocessor, memory, input-output (I/O) logic control, communication interfaces and components, as well as other hardware, firmware, and/or software to implement a communication device.

In this example, the SoC 500 is integrated with a microprocessor 502 (e.g., any of a microcontroller or digital signal processor) and input-output (I/O) logic control 504 (e.g., to include electronic circuitry). The SoC 500 also includes a memory controller 506 and a memory device 508, such as any type of a nonvolatile memory and/or other suitable electronic data storage device. The SoC can also include various firmware and/or software, such as an operating system 510 that is maintained by the memory and executed by the microprocessor.

The SoC 500 includes a device interface 512 to interface with a device or other peripheral component, such as when installed in any of the communication and/or computer devices described herein. The SoC 500 also includes an integrated data bus 514 that couples the various components of the SoC for data communication between the components. The data bus in the SoC may also be implemented as any one or a combination of different bus structures and/or bus architectures.

In embodiments of frame boundary detection, the SoC 500 includes an LTE signal receiver 516, such as one or more LTE antennas or other type of LTE signal receiver, that receives LTE data signals from LTE base stations. The LTE signal receiver also includes a frame boundary detection service 518 that can be implemented as computer-executable instructions maintained by the memory device 508 and executed by the microprocessor 502. Examples of the LTE signal receiver and the frame boundary detection service, as well as corresponding functionality and features, are described with reference to the respective components shown in FIGS. 1-4. Alternatively or in addition, components of the LTE signal receiver and frame boundary detection service can be implemented as hardware, firmware, fixed logic circuitry, or any combination thereof that is implemented in connection with the I/O logic control 504 and/or other processing and control circuits of the SoC.

Example methods 600 and 700 are described with reference to respective FIGS. 6 and 7 in accordance with one or more embodiments of frame boundary detection. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example method(s) may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 6:
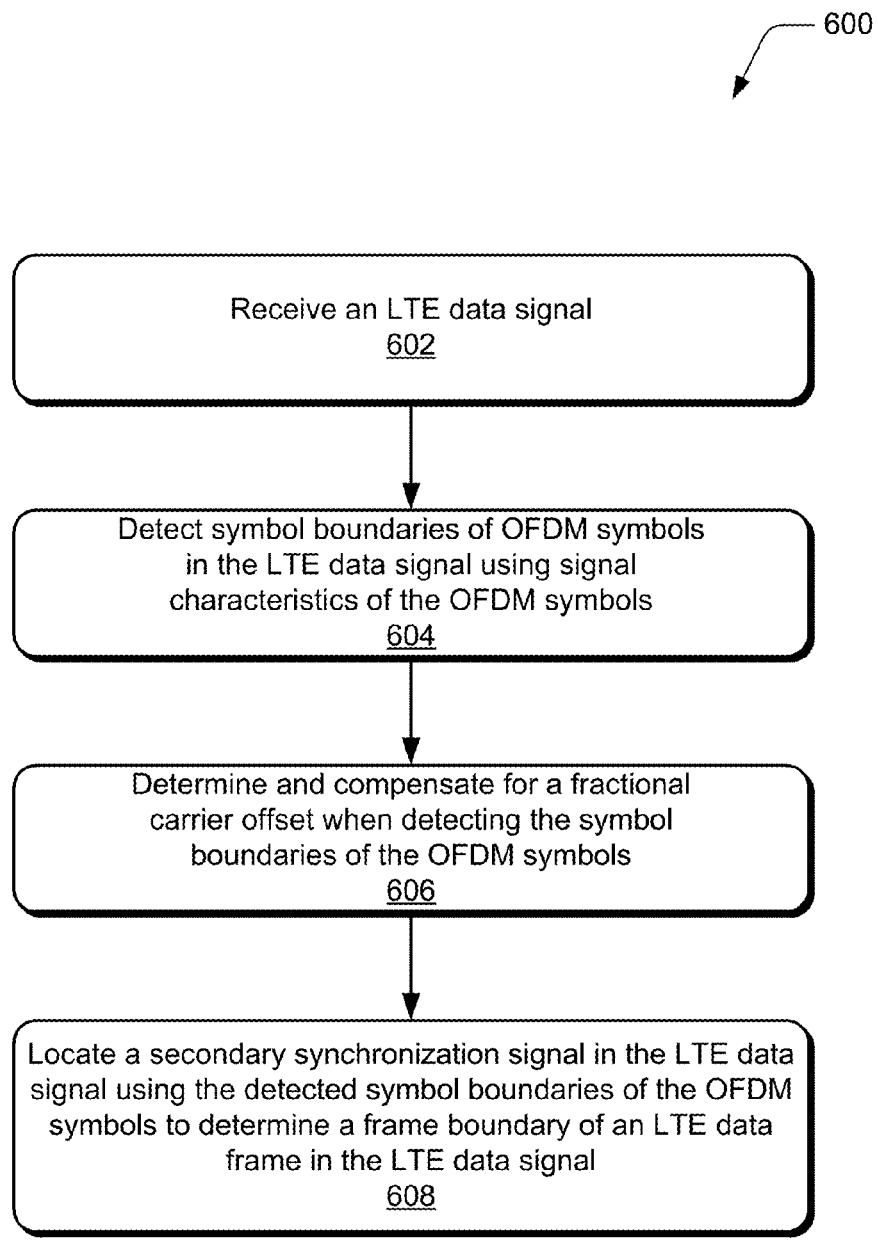
FIG. 6 illustrates example methods to of frame boundary detection in accordance with one or more embodiments.

FIG. 6 illustrates example method(s) 600 of LTE frame boundary detection. The order in which the method is described is not intended to be construed as a limitation, and any number of the described method blocks can be combined in any order to implement the method, or an alternate method.

At block 602, an LTE data signal is received. For example, the antenna 110 of communication device 102 (FIG. 1) receives an LTE data signal from base station 114.

At block 604, symbol boundaries of OFDM symbols in the LTE data signal are detected using signal characteristics of the OFDM symbols. For example, the frame boundary detection service 108 of communication device 102 detects symbol boundaries of OFDM symbols 208 (FIG. 2) in LTE data signal 112 using signal characteristics of the OFDM symbols. In embodiments, signal characteristics of the OFDM symbols include cyclic shift properties of the OFDM symbols, such as the property that a first portion of an OFDM symbol is the same as a last portion of the OFDM symbol At block 606, a fractional carrier offset is determined and compensated for when detecting the symbol boundaries of the OFDM symbols. For example, the frame boundary detection service 108 determines and compensates for a fractional carrier offset when detecting the symbol boundaries of the OFDM symbols 208.

At block 608, a secondary synchronization signal is located in the LTE data signal using the detected symbol boundaries of the OFDM symbols to determine a frame boundary of an LTE data frame in the LTE data signal. For example, the frame boundary detection service 108 locates any one of a pair of secondary synchronization signals 212 in the LTE data signal 112 using the detected symbol boundaries of the OFDM symbols 208 to determine a frame boundary of an LTE data frame 200 in the LTE data signal 112.

Figure 7:
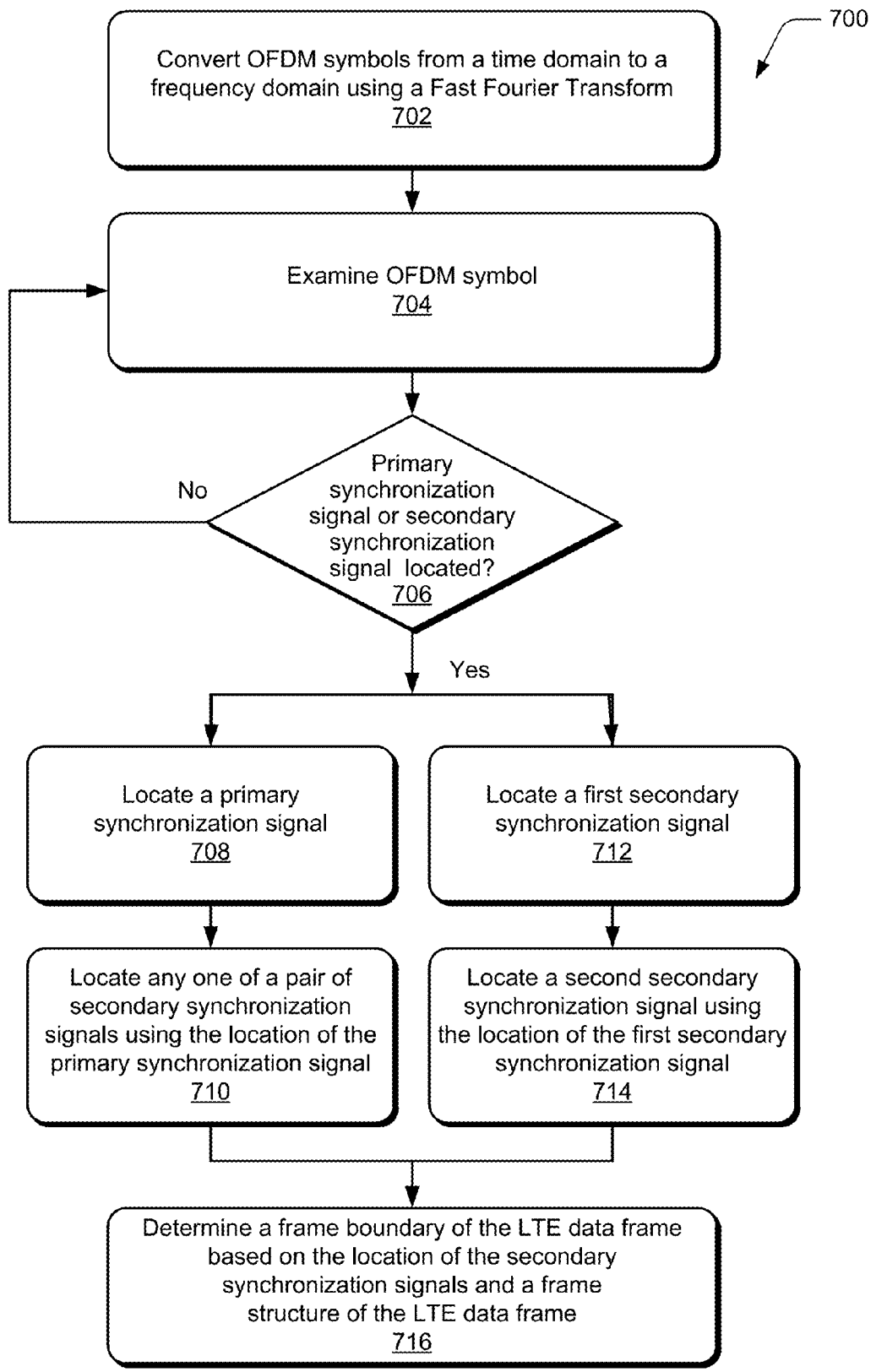
FIG. 7 illustrates additional example methods to of frame boundary detection in accordance with one or more embodiments.

FIG. 7 illustrates additional example method(s) 700 of LTE frame boundary detection. FIG. 7 further illustrates an embodiment of locating the secondary synchronization signal, as illustrated in step 608 in FIG. 6. Therefore, FIG. 7 begins after symbol boundaries of OFDM symbols are detected (step 604) and a fractional carrier offset is determined (step 606) in FIG. 6. The order in which the method is described is not intended to be construed as a limitation, and any number of the described method blocks can be combined in any order to implement the method, or an alternate method.

At block 702, OFDM symbols are converted from a time domain to a frequency domain using a Fast Fourier Transform. For example, the frame boundary detection service 108 of communication device 102 (FIG. 1) converts OFDM symbols 208 in LTE data frame 200 from a time domain to a frequency domain using a Fast Fourier Transform.

At block 704, OFDM symbols are examined. For example, the frame boundary detection service 108 examines OFDM symbols 208 in the LTE data frame 200. At block 706, a determination is made as to whether a primary synchronization signal or a secondary synchronization signal is located in a current OFDM symbol being examined. For example, the frame boundary detection service 108 determines whether the OFDM symbol 208 being examined contains a primary synchronization signal 210 or a secondary synchronization signal 212. If the frame boundary detection service determines that the current OFDM symbol does not contain a primary synchronization signal or a secondary synchronization signal (i.e., "no" from block 706), then at block 704, the frame boundary detection service continues to examine a next OFDM symbol to locate the primary synchronization signal or the secondary synchronization signal. When the frame boundary detection service locates a primary synchronization signal or a secondary synchronization signal (i.e., "yes" from block 706), then the method continues to block 708 or to block 712.

At block 708, a primary synchronization signal is located before a secondary synchronization signal is located. For example, the frame boundary detection service 108 locates a primary synchronization signal 210 in an OFDM symbol 208. At block 710, any one of the pair of secondary synchronization signals is located using the location of the primary synchronization signal. For example, the frame boundary detection service 108 locates any one of the pair of secondary synchronization signals 212 using the location of the primary synchronization signal 210.

Alternately, at block 712, a first secondary synchronization signal of the pair of secondary synchronization signals is located before a primary synchronization signal is located. For example, the frame boundary detection service 108 locates a first secondary synchronization signal 212 in the pair of secondary synchronization signals in an OFDM symbol 208. At block 714, a second secondary synchronization signal of the pair of secondary synchronization signals is located using the location of the first secondary synchronization signal. For example, the frame boundary detection service 108 locates the second secondary synchronization signal 212 in the pair of secondary synchronization signals using the location of the first secondary synchronization signal 212. Locating the second secondary synchronization signal is optional and generally easy to locate once the first secondary synchronization signal is found. Therefore, locating the second secondary synchronization signal may be performed simply for frame boundary detection verification.

At block 716, a boundary of the LTE data frame is determined based on the location of the secondary synchronization signals and a frame structure of the LTE data frame. For example, the frame boundary detection service 108 determines a boundary of the LTE data frame 200 based on the location of one or both of the pair of secondary synchronization signals 212 and a frame structure of the LTE data frame that is known by communication device 102.

Figure 8:
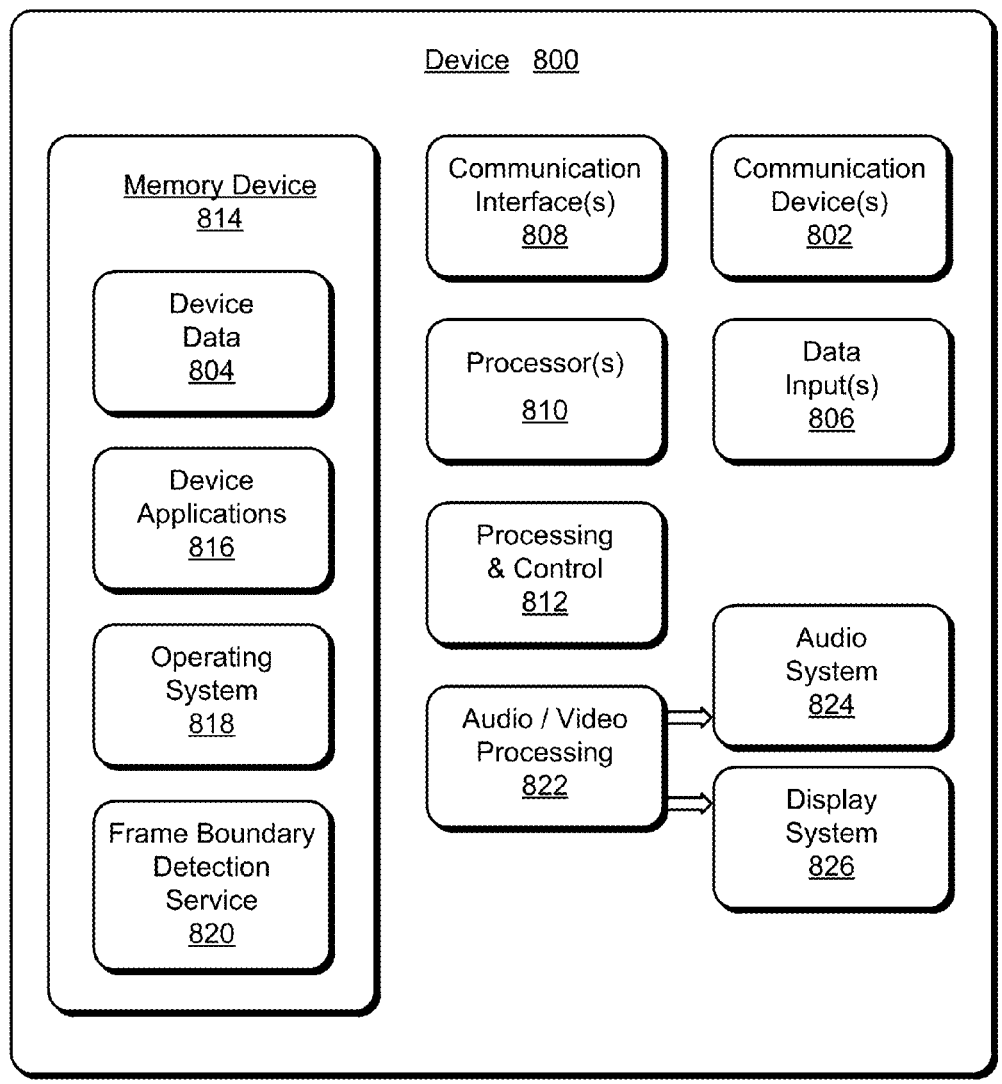
FIG. 8 illustrates various components of an example device that can implement embodiments of frame boundary detection.

FIG. 8 illustrates various components of an example device 800 that can be implemented as any of the devices, or services implemented by devices, described with reference to the previous FIGS. 1-7. The device may also be implemented to include the example system-on-chip (SoC) described with reference to FIG. 5. In embodiments, the device may be implemented as any one or combination of a fixed or mobile device, in any form of a consumer, computer, server, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 800 includes communication devices 802 that enable wired and/or wireless communication of device data 804, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 806 via which any type of data, media content, and/or inputs can be received, such as user-selectable inputs and any other type of audio, video, and/or image data received from any content and/or data source.

The device 800 also includes communication interfaces 808, such as any one or more of a serial, parallel, network, or wireless interface. The communication interfaces provide a connection and/or communication links between the device and a communication network by which other electronic, computing, and communication devices communicate data with the device.

The device 800 includes one or more processors 810 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 812. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 800 also includes one or more memory devices 814 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

A memory device 814 provides data storage mechanisms to store the device data 804, other types of information and/or data, and various device applications 816. For example, an operating system 818 can be maintained as a software application with a memory device and executed by the processors. The device applications may also include a device manager, such as any form of a control application, software application, signal processing and control module, code that is native to a particular device, a hardware abstraction layer for a particular device, and so on. In this example, the device applications 816 include a frame boundary detection service 820, such as when device 800 is implemented as an LTE communication device. The frame boundary detection service is shown as software and/or a computer application. Alternatively or in addition, the frame boundary detection service can be implemented as hardware, software, firmware, fixed logic, or any combination thereof.

The device 800 also includes an audio and/or video processing system 822 that generates audio data for an audio system 824 and/or generates display data for a display system 826. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of frame boundary detection have been described in language specific to features and/or methods, the subject of the appended claims is not necessarily limited to the specific features or methods described. Rather the specific features and methods are disclosed as example implementations of LTE frame boundary detection. Also, techniques disclosed herein may be applicable to communication networks other than an LTE communication network.

The invention claimed is:

1. A communication device, comprising:
one or more antennas configured to receive a data signal comprising a plurality of different synchronization signals;
a memory and a processor to implement a frame boundary detection service, wherein the frame boundary detection service is configured to:
detect symbol boundaries of orthogonal frequency-division multiplexing (OFDM) symbols in the data signal based on signal characteristics of the OFDM symbols; and
locate one or more of the plurality of different synchronization signals in the data signal to determine a frame boundary of a data frame in the data signal by:
examining the OFDM symbols using the detected symbol boundaries of the OFDM symbols;
locating a primary synchronization signal in one of the OFDM symbols; and
locating a secondary synchronization signal using a location of the primary synchronization signal.

2. The communication device as recited in claim 1, wherein the signal characteristics of the OFDM symbols comprise cyclic shift properties of the OFDM symbols, at least one of the cyclic shift properties including a first portion of an OFDM symbol being the same as a last portion of the OFDM symbol.

3. The communication device as recited in claim 1, wherein, to locate the one or more of the plurality of different synchronization signals, the frame boundary detection service is further configured to convert the OFDM symbols from a time domain to a frequency domain using a Fast Fourier Transform (FFT).

4. The communication device as recited in claim 1, wherein the frame boundary detection service is further configured to determine and compensate for a fractional carrier frequency offset when detecting the symbol boundaries of the OFDM symbols.

5. The communication device as recited in claim 1, wherein the frame boundary detection service is further configured to locate the one or more of the plurality of different synchronization signals by:
locating a second secondary synchronization signal of a pair of secondary synchronization signals using the location of the located secondary synchronization signal, the located secondary synchronization signal being the first secondary synchronization signal of the pair of secondary synchronization signals in one of the OFDM symbols.

6. The communication device as recited in claim 1, wherein the located one or more of the plurality of different synchronization signals comprise secondary synchronization signals of a long term evolution (LTE) data signal, and wherein the frame boundary detection service is further configured to determine the frame boundary of the LTE data frame based on the location of the secondary synchronization signals and a frame structure of an LTE data frame.

7. A method, comprising:
receiving a long term evolution (LTE) data signal;
detecting symbol boundaries of orthogonal frequency-division multiplexing (OFDM) symbols in the LTE data signal based on signal characteristics of the OFDM symbols; and
locating one or more of a plurality of different synchronization signals in the LTE data signal using the detected symbol boundaries of the OFDM symbols to determine a frame boundary of an LTE data frame in the LTE data signal by:
examining the OFDM symbols using the detected symbol boundaries of the OFDM symbols;
locating a secondary synchronization signal in one of the OFDM symbols; and
locating a primary synchronization signal using a location of the secondary synchronization signal.

8. The method as recited in claim 7, wherein the signal characteristics of the OFDM symbols comprise cyclic shift properties of the OFDM symbols, and wherein at least one of the cyclic shift properties includes a first portion of an OFDM symbol being the same as a last portion of the OFDM symbol.

9. The method as recited in claim 7, wherein locating the secondary synchronization signal comprises:
converting the OFDM symbols from a time domain to a frequency domain using a Fast Fourier Transform (FFT).

10. The method as recited in claim 7, further comprising compensating for a fractional carrier frequency offset (CFO) when detecting the symbol boundaries of the OFDM symbols.

11. The method as recited in claim 7, wherein locating the secondary synchronization signal further comprises:
locating a second secondary synchronization signal of a pair of secondary synchronization signals using the location of the located secondary synchronization signal, the located secondary synchronization signal being the first secondary synchronization signal of the pair of secondary synchronization signals in one of the OFDM symbols.

12. The method as recited in claim 7, further comprising determining the boundary of an LTE data frame based on the location of the secondary synchronization signal and a frame structure of the LTE data frame.

13. A system-on-chip, comprising:
an LTE signal receiver configured to receive a long term evolution (LTE) data signal;
a frame boundary detection service that is programmed to:
detect symbol boundaries of orthogonal frequency-division multiplexing (OFDM) symbols in the LTE data signal based on signal characteristics of the OFDM symbols; and
locate one or more of a plurality of different synchronization signals in the LTE data signal using the detected symbol boundaries of the OFDM symbols to determine a frame boundary of an LTE data frame in the LTE data signal by:
examining the OFDM symbols using the detected symbol boundaries of the OFDM symbols;
locating one of either a primary synchronization signal or a secondary synchronization signal of a pair of secondary synchronization signals in one of the OFDM symbols; and
based on said locating, locating the other of the primary synchronization signal and the secondary synchronization signal of the pair of secondary synchronization signals.

14. The system-on-chip as recited in claim 13, wherein the signal characteristics of the OFDM symbols comprise cyclic shift properties of the OFDM symbols, and wherein at least one of the cyclic shift properties includes a first portion of an OFDM symbol being the same as a last portion of the OFDM symbol.

15. The system-on-chip as recited in claim 13, wherein the frame boundary detection service is further programmed to determine and compensate for a fractional carrier frequency offset (CFO) when the symbol boundaries of the OFDM symbols are detected.

16. The system-on-chip as recited in claim 13, wherein the frame boundary detection service is further programmed to locate the secondary synchronization signal by:

locating a second secondary synchronization signal of the pair of secondary synchronization signals using the location of the located secondary synchronization signal of the pair of secondary synchronization signals in one of the OFDM symbols.

17. The system-on-chip as recited in claim 13, wherein the frame boundary detection service is further programmed to determine the frame boundary of the LTE data frame based on the location of the secondary synchronization signal and a frame structure of the LTE data frame.

18. The system-on-chip as recited in claim 13, wherein, to locate the one or more of the plurality of different synchronization signals, the frame boundary detection service is further configured to convert the OFDM symbols from a time domain to a frequency domain using a Fast Fourier Transform (FFT).

19. The system-on-chip as recited in claim 13, wherein the first located synchronization signal is the primary synchronization signal.

20. The system-on-chip as recited in claim 13, wherein the first located synchronization signal is one of the pair of secondary synchronization signals.

* * * * *